Aug. 8, 1950

Z. TAKATS 2,517,733

POWER DRIVEN ECCENTRICALLY ACTUATED
CIRCULATORY EARTH CULTIVATOR

Filed Nov. 9, 1945

ZOLTAN TAKATS
INVENTOR.

BY Donald T. Hillier

ATTORNEY

Patented Aug. 8, 1950

2,517,733

UNITED STATES PATENT OFFICE 2,517,733

POWER-DRIVEN ECCENTRICALLY ACTUATED CIRCULATORY EARTH CULTIVATOR

Zoltan Takats, Vestal, N. Y.

Application November 9, 1945, Serial No. 627,614

9 Claims. (Cl. 97—34)

My invention relates to earth cultivators of the type including a plurality of tines arranged to be drawn through the earth to loosen the soil and remove weeds and rocks therefrom.

One particular feature of the invention is the provision of means for imparting a rotary movement to the tines as they are drawn ahead through the earth, whereby complete cultivation of the soil may be achieved with many resulting advantages, as will be later more specifically described.

It is another object of my invention to provide means whereby the provided engine may be selectively connected to either, both or neither the driving wheels and/or the tine rotating means, so that the apparatus may be controlled by the operator with a minimum of effort.

It is also a general object of this invention to provide a simple, inexpensive, and easily managed machine which will provide complete cultivation.

In order that the exact nature of my invention may be understood, reference is made to the accompanying drawings, wherein Fig. 1 is a perspective view of a complete cultivator incorporating my invention.

Figure 1:
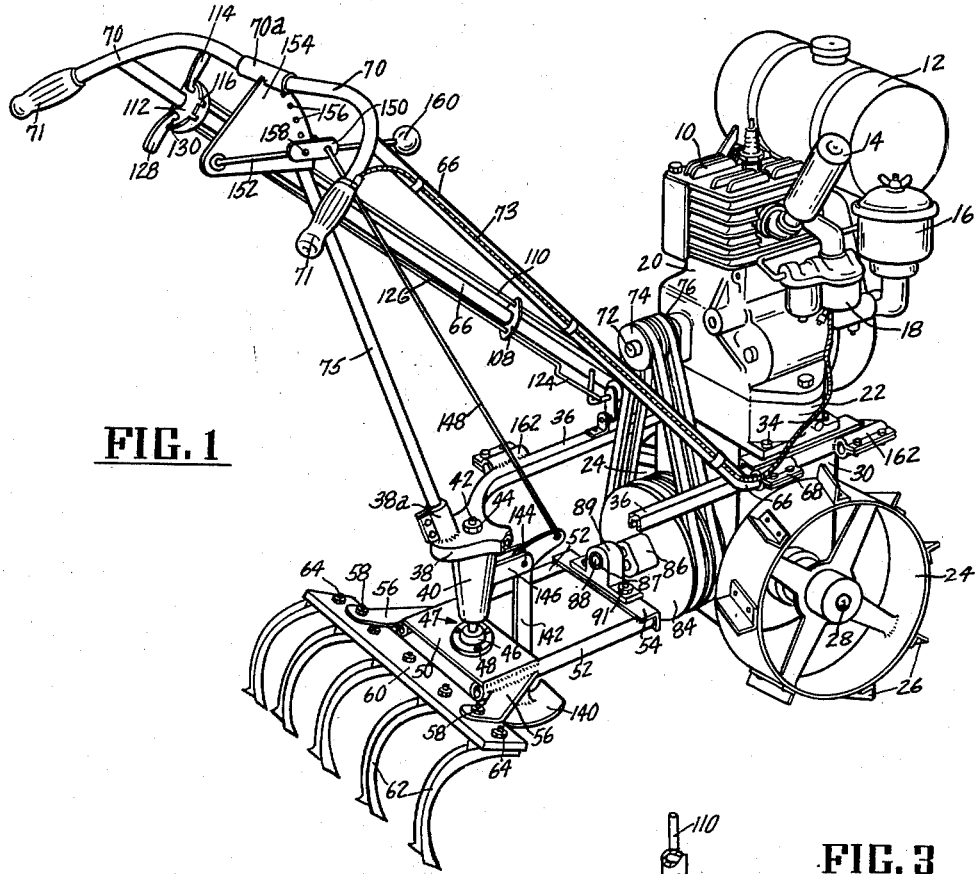

Reference is now made to Fig. 1 where a conventional engine 10, fuel tank 12, muffler 14, carburetor filter 16 and carburetor 18 are shown, all supported by the crankcase 20 which in turn is supported by the engine base 22. The drive wheels 24 are provided with cleats 26, and the drive wheels are affixed upon the axles 28 (only one shown) so as to support the axles as well as to be driven thereby. The axles 28 enter the gear housing 30 to support the gear housing and all the parts held thereby, as well as to be driven by apparatus within the housing in a manner to be later more fully explained.

Affixed to the gear housing 30 and the engine base 22 by means of bolts 34 are the arms 36 of the yoke which also includes the base 38. Depending from and suitably fixedly attached to the base 38 is the hollow, tapered member 40 through which the rod 42 extends, the upper end of rod 42 being threaded and supported by the nut 44 which bears against the base 38. The lower end of rod 42 may be in the form of a ball which is held inside the socket 46 to form the ball and socket joint designated generally by 47.

Socket 46 is affixed by bolts 48 to the plate 50 which in turn is affixed, as by welding, to the forwardly extending tubes 52, the forward ends of which may be welded to the cross piece 54. Affixed to each of the tubes 52 is a bracket 56, each of which by means of a nut and bolt arrangement 58 supports the transverse bar 60, to which a plurality of slightly springy, vertically disposed transversely separated removable tines 62, shaped as shown, are bolted at 64.

Figure 3:
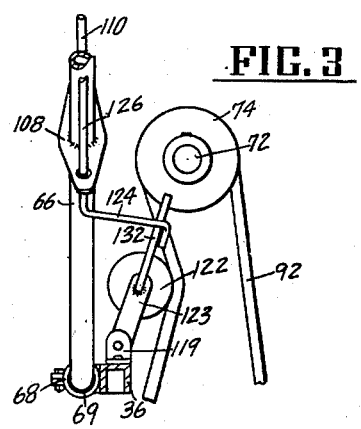
Fig. 3 is a detailed view of one of the clutching arrangements.

A pair of handle-supporting bars 66 are provided, as shown, each of these handles being affixed to a different one of the yoke arms 36 by means of the clamps 68, the left clamp being shown in Fig. 3. A layer of live rubber 69 may be placed between each of the clamps 68 and the enclosed bar 66 to prevent to a large degree the transmission of vibration of the bars 36 to the handle supporting bars 66. The handle bars 70 in turn are supported by the bars 66. A pair of handles 71 are carried by the handle bars, the right handle being rotatably mounted upon its bar and connected to the butterfly valve of the carburetor 18 through the flexible shaft 73 so that the speed of engine 10 may be controlled by a rotation of this handle. Also a central post 75 having its upper end attached to the coupling 70a which holds the handle bars 70 and its lower end affixed in the clamp 38a fixedly carried by the base 38 is provided. The lower end of post 75 may be encased in rubber to prevent to a large degree the transmission of vibration from base 38 to the handle bars 70.

Figure 2:
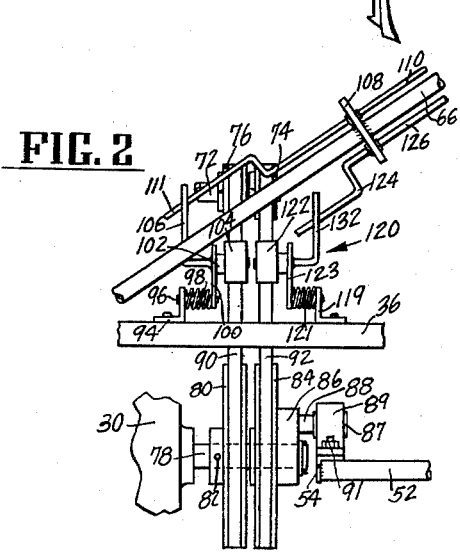
Fig. 2 is a left side elevation showing in detail the clutching mechanism and the rotary tine-driving means.

Referring now also to Figs. 2 and 3, it will be appreciated that the shaft 72 is driven by the crank-shaft within the crank-case 20, and affixed upon shaft 72 are the two pulleys 74 and 76. The input shaft of the gear housing 30 is designated 78, and a larger pulley 80 is affixed thereupon by pin 82. A pulley 84 of equal size to pulley 80 idles upon shaft 78, and integral with this pulley is the block 86 which carries a rod 88 integral therewith, the axis of rod 88 being radially displaced from the axis of shaft 78, as shown. A self-aligning bearing 87 is carried by the bearing housing 89, the rear end of rod 88 being mounted in this bearing, and bearing housing 89 in turn being affixed to the transverse member 54 by means of bolts 91.

Pulley 80 is fore and aft aligned with pulley 76, and a belt 90 connects these two pulleys so that pulley 80 is driven by pulley 76 under circumstances to be later described. Similarly, pulley 84 is fore and aft aligned with pulley 74, and a belt 92 connects these two pulleys so that pulley 74 drives pulley 84 under circumstances to be later described.

In Fig. 2 it will be seen that the left yoke arm 36 has affixed thereto a bracket 94 which fixedly supports a horizontal rod 96 encircled by a torsion spring 98 having its forward end anchored to the fixed bracket 94 and its rear end to the arm 100, the lower end of which is pivotally mounted upon the rear end of rod 96. The upper end of arm 100 supports, to the rear, the rod 102 upon which the clutch wheel 104 is rotatably mounted, and the upper end of arm 100 also fixedly supports the crank 106, the longer extension of which extends generally upward. Spring 98, under circumstances to be later described, biases arm 100 to move wheel 104 into engagement with belt 90 to tighten this belt so that pulley 76 will drive pulley 80.

Placed upon the left bar 66 is the bracket 108 which movably supports the shaft 110 which runs parallel with bar 66, the forward end of shaft 110 being in the form of a crank 111. The rear upper end of shaft 110 is movably supported by the circular bracket 112 which is affixed upon the rod 66 near its upper end, and integral with the rear end of shaft 110 is the handle 114. A pair of notches 116 (only one visible) are placed in the circumference of bracket 112, and handle 114 may be selectively engaged in either of these notches. The crank 111 is positioned so as to always bear against the vertical portion of crank 106, and as shown in Fig. 1, handle 114 is positioned to place crank 111 in its most counterclockwise position in order to move roller 104 away from belt 90.

A second bracket 119, torsion spring 121, arm 123, roller 122, and crank 125 exactly like the arrangement previously described is provided to force the roller 122 of this assembly against the belt 92 so as to assure a driving connection between the pulley 74 and driven pulley 84. A crank 124 is integral with the lower end of shaft 126 which is supported by brackets 108 and 112, the upper end of this shaft having a handle 128 adapted to be selectively engaged in either of the two notches 130 (only one shown) in bracket 112. The crank 124 is arranged to always engage the right side of the crank 132 of assembly 120. In Fig. 1 the handle 128 is shown in the clockwise notch 130, and in Fig. 3 it will be seen that the crank 124 is shown in its counterclockwise position, thereby allowing the torsion spring 121 to force the roller 124 against belt 92 to take up the slack in this belt and establish a driving connection between the pulleys 126 and 84.

In the operation of the apparatus of my invention, before the engine 10 is started, the handle 114 is preferably rotated counterclockwise and engaged in the most counterclockwise notch 116 in bracket 112, as seen in Fig. 1, and the crank 111 is rotated in the same direction, forcing the extension 106, roller 104, and arm 100 away from the belt 90, as seen in Fig. 2. Also handle 128 is rotated clockwise to disengage roller 122 from belt 92 in a manner which will be understood without a detailed explanation. The engine 10 may then be started in the conventional manner, and the shaft 72 and pulleys 74 and 76 will be rotated, but the belts 90 and 92 will not drive the pulleys 80 and 84 because the clutch rollers 104 and 122 are disengaged from the belts 90 and 92, allowing these belts to slacken.

When the operator desires to move the cultivator to the location to be worked, the handle 114 is rotated clockwise and engaged in the clockwise notch 116, which operation moves the crank 111 away from arm 106, and permits spring 98 to force roller 104 against belt 90, thereby tightening the same and establishing a driving connection between the pulley 76 and pulley 80. Pulley 80, being fixed upon shaft 78, will rotate the same, and by means of conventional gearing within gear housing 30, the axles 28 will be rotated, rotating the wheels 24 and causing the device to move ahead.

When the apparatus reaches the location to be cultivated the handle 128 may be rotated counterclockwise and placed in the most counterclockwise notch 130 in bracket 112, whereupon the torsion spring 121 forces the roller 122 against the belt 92, tightening the same and establishing a driving connection between the pulley 74 and pulley 84. Pulley 84 will therefore be rotated, as will block 86 and the eccentric rod 88, the axis of rod 88 describing a circle about the axis of shaft 78 upon which pulley 84 is mounted. The circular motion of rod 88 will cause the self-aligning bearing 87 and the bearing housing 89 to describe a circle about the axis of shaft 78, and it will be seen that through the means of the transverse member 54, tubes 52, plate 50, ball joint 47, brackets 56 and transverse bar 60, the tines 62 will have a rotary movement imparted thereto, the ball joint 47 acting in the form of a universal pivot for all of the members moved by rod 88.

Accordingly, as the device is moved ahead in the previously explained manner, the lower ends of the tines 62 are not only moved ahead, but they simultaneously rotate, thereby describing a spiral path through the soil.

Because of the forward, transverse, and vertical movements simultaneously imparted to the tines by my novel mechanism, it is possible to obtain complete cultivation—an accomplishment impossible with machines known to the prior art. The tines not only shear the weeds against the earth, but they also scatter the weeds on the surface because of the universal movement of the tines. Also, rocks are brought to the surface, and, needless to say, greater loosening of the dirt is accomplished. Neither dirt, weeds nor rocks are accumulated ahead of the tines because the motion of the tines effectively throws them off. Also it is possible to use a much less powerful engine because the forces of the tines are at all times applied in the direction of dispersal of the dirt, rocks and weeds.

It should be noted that in the event the load upon the tines in any direction becomes excessive and thereby transmits an excessive load to the belts 90 or 92, the resilient springs 98 and/or 121 will allow the rollers 104 and/or 122 to move to the left, thereby permitting slippage between the drive pulleys 74 and/or 76 and their associated belts.

Referring again to Fig. 1 it will be seen that there is provided a shoe 140, shaped as shown, having integral therewith the bell crank 142 pivotally held at 144 by the brackets 146 integral with the member 140 which is affixed to the yoke base 38. A link 148 has its lower end pivotally attached to the forward arm of bell crank 142, and the upper end of this link is pivotally connected to the plate 150 which is affixed to the lever 152 which is pivotally mounted in the lower rear corner of plate 154 which is fixedly held by the handle bars 70. A plurality of holes 156 are placed in plate 154, and a pin 158, held by plate 154 is arranged to be selectively inserted in any one of the holes 156 by movement of the handle 160 upon the end of lever 152.

It will be appreciated that as the handle 160 is raised the link 148 pivots bell crank 142, and the shoe 140 is moved ahead, and because of the non-circular shape of shoe 140 the pivot point 142 will be lowered, allowing the tines 62 to drop farther below the lowermost portion of shoe 140. On the other hand, when handle 160 is lowered, crank 142 is pivoted and the point 144 is raised, and the tines are raised with respect to the lowermost portion of shoe 140. Shoe 140 moves along and bears against the surface of the ground ahead of the tines 62, and consequently, by means of handle 160 the depth cultivated by the tines 62 may be selectively regulated.

It should be noted that the shoe 140 is held by the member 40 which is not affected by the rotary motion imparted to the tines, and so the shoe 140 moves straight ahead, during cultivation, along the surface of the ground.

Also affixed to the frame members 36 are a plurality of clamps 162 by means of which auxiliary implements may be attached to the apparatus.

It will be appreciated that many changes may be made in the disclosed embodiment of my invention without departing from the substance thereof, as defined by the following claims. All such changes are intended to be covered by these claims.

I claim:

1. In a cultivator of the type described, the combination of an engine, a fixed frame member, a second frame member, a plurality of tines fixedly attached to one end of said second frame member, a connection between said fixed frame member and said second frame member for universally supporting said second frame member at a point intermediate the ends thereof, and means interconnecting said engine and the end of said second frame member away from said tines for imparting a circular motion to the said end.

2. In a cultivator of the type described, the combination of an engine and a shaft, a connection between said engine and said shaft, an eccentric connected to said shaft to be driven thereby, a fixed frame member, a second frame member and a plurality of tines affixed to one end thereof, said second frame member having its other end connected to said eccentric for imparting a circular movement thereto and a member having one end supported by said fixed frame member and its other end universally connected to the second frame member at a point intermediate the tines and the eccentric for supporting the second frame member.

3. In a cultivator of the class described, the combination of an engine, a pair of propelling wheels arranged to roll over the ground, a fixed frame member, a second frame member, a plurality of tines fixedly attached to one end of said second frame member and arranged to be lowered into the ground to be drawn therethrough by said propelling wheels, a supporting member held by said fixed frame member and universally attached to said second frame member at a point intermediate the ends thereof for supporting the same, a connection between said engine and said wheels for rotating the same, and means interconnecting said engine and the end of said second frame member away from said tines for imparting a circular movement thereto.

4. In a cultivator of the class described, the combination of an engine, a pair of propelling wheels arranged to roll over the ground, a fixed frame member, a second frame member, a plurality of tines fixedly attached to the rear end of said second frame member and arranged to be lowered into the ground to be drawn therethrough by said propelling wheels, a supporting member held by said fixed frame member and universally attached to said second frame member for supporting the same at a point ahead of said tines, a connection between said engine and said wheels for rotating the same, and means including manually operable clutching means interconnecting said engine and the front end of said second frame member for imparting a circular movement thereto.

5. In a cultivator of the class described, the combination of an engine, a pair of propelling wheels arranged to roll over the ground, a fixed frame member, a second frame member, a plurality of tines fixedly attached to the rear end of said second frame member and arranged to be lowered into the ground to be drawn therethrough by said propelling wheels, a supporting member held said fixed frame member and universally attached to said second frame member for supporting the same at a point ahead of said tines, a connection between said engine and said wheels for rotating the same, a pulley rotated by said engine, a second pulley and an eccentric driven thereby, a connection between said eccentric and the front end of said second frame member for imparting a circular motion thereto, a normally slack belt connecting said pulleys, a manual control and a roller positioned adjacent said belt, and a connection between said manual control and said roller for selectively positioning said roller against said belt to establish a driving connection between said pulleys.

6. In a cultivator of the class described, the combination of an engine, a pair of propelling wheels arranged to roll over the ground, a fixed frame member, a second frame member, a plurality of tines fixedly attached to the rear end of said second frame member and arranged to be lowered into the ground to be drawn therethrough by said propelling wheels, a supporting member held by said fixed frame member and universally attached to said second frame member for supporting the same at a point ahead of said tines, a connection between said engine and said wheels for rotating the same, a pulley rotated by said engine, a second pulley and an eccentric driven thereby, a connection between said eccentric and the front end of said second frame member for imparting a circular motion thereto, a normally slack belt connecting said pulleys, a manual control and a roller positioned adjacent said belt, and a connection comprising an automatically releasable member responsive to the load upon said belt between said manual control and said roller for selectively positioning said roller against said belt to establish a driving connection between said pulleys.

7. In a cultivator of the class described, the combination of an engine, a pair of propelling wheels arranged to roll over the ground, a fixed frame member, a second frame member, a plurality of tines fixedly attached to the rear end of said second frame member and arranged to be lowered into the ground to be drawn therethrough by said propelling wheels, a supporting member held by said fixed frame member and universally attached to said second frame member for supporting the same at a point ahead of said tines, a member having a surface arranged to bear against the surface of the ground, a connection between said member and said fixed frame for supporting the frame member, manually controllable means for adjusting the distance between said fixed frame and the lowermost surface of said member, and means interconnecting said engine and the front end of said second frame member for imparting a circular movement thereto.

8. In a cultivator of the class described, the combination of an engine, a pair of propelling wheels arranged to roll over the ground, a fixed frame member, a second frame member, a plurality of tines fixedly attached to the rear end of said second frame member and arranged to be lowered into the ground to be drawn therethrough by said propelling wheels, a supporting member held by said fixed frame member and universally attached to said second frame member for supporting the same at a point ahead of said tines, a pivot held by said fixed frame member, a depending arm attached to said pivot, an eccentric shoe held by the lower end of said arm to bear against the surface of the ground, manually controllable means for adjusting the position of said depending arm, and means interconnecting said engine and the front end of said second frame member for imparting a circular movement thereto.

9. In a cultivator of the class described, the combination of an engine, a pair of propelling wheels arranged to roll over the ground, a fixed frame member, a second frame member, a plurality of tines fixedly attached to the rear end of said second frame member and arranged to be lowered into the ground to be drawn therethrough by said propelling wheels, a supporting member held by said fixed frame member and pivotally attached to said second frame member for supporting the same at a point ahead of said tines, a connection between said engine and said wheels for rotating the same, and means interconnecting said engine and the front end of said second frame member for imparting a circular movement thereto.

ZOLTAN TAKATS.

REFERENCES CITED

The following references are of record in the file of this patent:

UNITED STATES PATENTS

| Number | Name | Date |
|---|---|---|
| 503,434 | Neal et al. | Aug. 15, 1893 |
| 987,171 | Riester | Mar. 21, 1911 |
| 1,038,454 | Stevens | Sept. 10, 1912 |
| 1,868,330 | Martin | July 19, 1932 |